US012200307B2

(12) United States Patent
Iwata

(10) Patent No.: US 12,200,307 B2
(45) Date of Patent: Jan. 14, 2025

(54) INFORMATION PROCESSING SYSTEM, INFORMATION PROCESSING APPARATUS, AND INFORMATION PROCESSING METHOD

(71) Applicant: SpoLive Interactive, Inc., Tokyo (JP)

(72) Inventor: Yuhei Iwata, Tokyo (JP)

(73) Assignee: SpoLive Interactive, Inc., Tokyo (JP)

( * ) Notice: Subject to any disclaimer, the term of this patent is extended or adjusted under 35 U.S.C. 154(b) by 88 days.

(21) Appl. No.: 18/145,851

(22) Filed: Dec. 23, 2022

(65) Prior Publication Data

US 2023/0128604 A1 Apr. 27, 2023

Related U.S. Application Data

(63) Continuation of application No. PCT/JP2021/045563, filed on Dec. 10, 2021.

(30) Foreign Application Priority Data

Jan. 29, 2021 (JP) ................................. 2021-012928

(51) Int. Cl.
  *H04N 21/4784* (2011.01)
  *H04N 21/431* (2011.01)
  *H04N 21/472* (2011.01)
(52) U.S. Cl.
  CPC ..... *H04N 21/4784* (2013.01); *H04N 21/4316* (2013.01); *H04N 21/472* (2013.01)
(58) Field of Classification Search
  CPC ............. H04N 21/4784; H04N 21/472; H04N 21/4316
  See application file for complete search history.

(56) References Cited

U.S. PATENT DOCUMENTS

| 2004/0211100 A1* | 10/2004 | Scherba | .............. G09F 15/0025 |
| | | | 40/560 |
| 2006/0094409 A1 | 5/2006 | Inselberg | |
| 2017/0003740 A1* | 1/2017 | Verfaillie | ................ A63F 13/87 |
| 2017/0103448 A1* | 4/2017 | Cashion | ............. G06Q 30/0641 |
| 2018/0288485 A1 | 10/2018 | Sugio et al. | |
| 2020/0009458 A1* | 1/2020 | Onda | ....................... A63F 13/86 |
| 2020/0238155 A1* | 7/2020 | German | .................. G09F 9/301 |

FOREIGN PATENT DOCUMENTS

| JP | 2012120098 A | 6/2012 |
| JP | 2016123069 A | 7/2016 |
| JP | 2018171282 A | 11/2018 |
| JP | 6921463 B1 | 8/2021 |

* cited by examiner

*Primary Examiner* — Nnenna N Ekpo
(74) *Attorney, Agent, or Firm* — HAUPTMAN HAM, LLP

(57) ABSTRACT

An information processing apparatus including: a display processing part that causes a display unit to display content including at least one of a moving image of a competition or text indicating a situation in the competition; a request accepting part that accepts, from a supporter of the competition, a support request for selecting support goods to cheer on a player performing in the competition; and an information presenting part that presents, to at least one of the player or other supporters, any one of a plurality of plays in the competition and support information corresponding to the support goods in association with each other.

20 Claims, 8 Drawing Sheets

| PLAYER'S ID | NAME OF PLAYER | GIFT | DATE/TIME OF SUPPORT | SUPPORTER'S ID | NAME OF SPONSER |
|---|---|---|---|---|---|
| ABC001 | TARO TANAKA | 500 JPY | 2021/1/25 18:35 | 11001 | – |
| | | 500 JPY | ... | ... | – |
| | | 500 JPY | 2021/1/25 18:35 | 32443 | – |
| | | SHOES | 2021/1/25 18:35 | 10220 | SHOE T COMPANY |
| ABC002 | JIRO SATO | 500 JPY | 2021/1/25 19:10 | 13211 | – |
| | | 500 JPY | ... | ... | – |
| | | 500 JPY | ... | 11033 | – |
| ... | ... | ... | ... | ... | ... |

| PLAYER'S ID | NAME OF PLAYER | GIFT | DATE/TIME OF SUPPORT | SUPPORTER'S ID | NAME OF SPONSER |
|---|---|---|---|---|---|
| ABC001 | TARO TANAKA | 500 JPY | 2021/1/25 18:35 | 11001 | - |
| | | 500 JPY | ⋮ | ⋮ | - |
| | | 500 JPY | 2021/1/25 18:35 | 32443 | - |
| | | SHOES | 2021/1/25 18:35 | 10220 | SHOE T COMPANY |
| ABC002 | JIRO SATO | 500 JPY | 2021/1/25 19:10 | 13211 | - |
| | | 500 JPY | ⋮ | ⋮ | - |
| | | 500 JPY | ⋮ | 11033 | - |
| ⋮ | ⋮ | ⋮ | ⋮ | ⋮ | ⋮ |

FIG. 7

INFORMATION PROCESSING SYSTEM, INFORMATION PROCESSING APPARATUS, AND INFORMATION PROCESSING METHOD

CROSS-REFERENCE TO RELATED APPLICATIONS

The present application is a continuation application of International Application number PCT/JP2021/045563, filed on Dec. 10, 2021, which claims priority under 35 U.S.C § 119(a) to Japanese Patent Application No. 2021-012928, filed on Jan. 29, 2021, contents of which are incorporated herein by reference in their entirety.

BACKGROUND OF THE INVENTION

The present disclosure relates to an information processing system, an information processing apparatus, and an information processing method. Conventionally, a system has been known that accepts a support message from a user who watches a competition, while displaying a moving image of the competition (for example, refer to Japanese Unexamined Patent Application Publication No. 2018-171282).

Different plays occur one after another in a competition. In the conventional system, there was a problem that it was difficult to understand which play in the competition a support message posted by the user was intended for.

BRIEF SUMMARY OF THE INVENTION

The present disclosure focuses on this point, and its object is to make it possible to identify which play a supporter of the competition has cheered for.

An information processing system according to a first aspect of the present disclosure including: a supporter terminal used by a supporter who supports a competition; a player terminal used by a player who performs in the competition; and an information processing apparatus that presents, to the player terminal, support information including the content of support input in the supporter terminal, wherein the information processing apparatus includes: a display processing part that causes a display unit of the supporter terminal to display content including at least one of a moving image of the competition or text indicating a situation in the competition; a request accepting part that accepts, from the supporter terminal, a support request for selecting support goods to cheer on a player performing in the competition; and an information presenting part that presents, to the player terminal, any one of a plurality of plays in the competition and support information corresponding to the support goods in association with each other.

An information processing apparatus according to a second aspect of the present disclosure includes a display processing part that causes a display unit to display content including at least one of a moving image of a competition or text indicating a situation in the competition; a request accepting part that accepts, from a supporter of the competition, a support request for selecting support goods to cheer on a player performing in the competition; and an information presenting part that presents, to at least one of the player or other supporters, any one of a plurality of plays in the competition and support information corresponding to the support goods in association with each other.

An information processing method according to a third aspect of the present disclosure includes: displaying, on a display unit, content including at least one of a moving image of a competition or text indicating a situation in the competition; accepting, from a supporter of the competition, a support request for selecting support goods to cheer on a player performing in the competition; and presenting, to at least one of the player or other supporters, any one of a plurality of plays in the competition and support information corresponding to the support goods in association with each other, that are executed by a computer.

BRIEF DESCRIPTION OF THE DRAWINGS

FIG. 7 is a diagram showing an example of support information stored in a storage.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Outline of an Information Processing System S]

Figure 1:
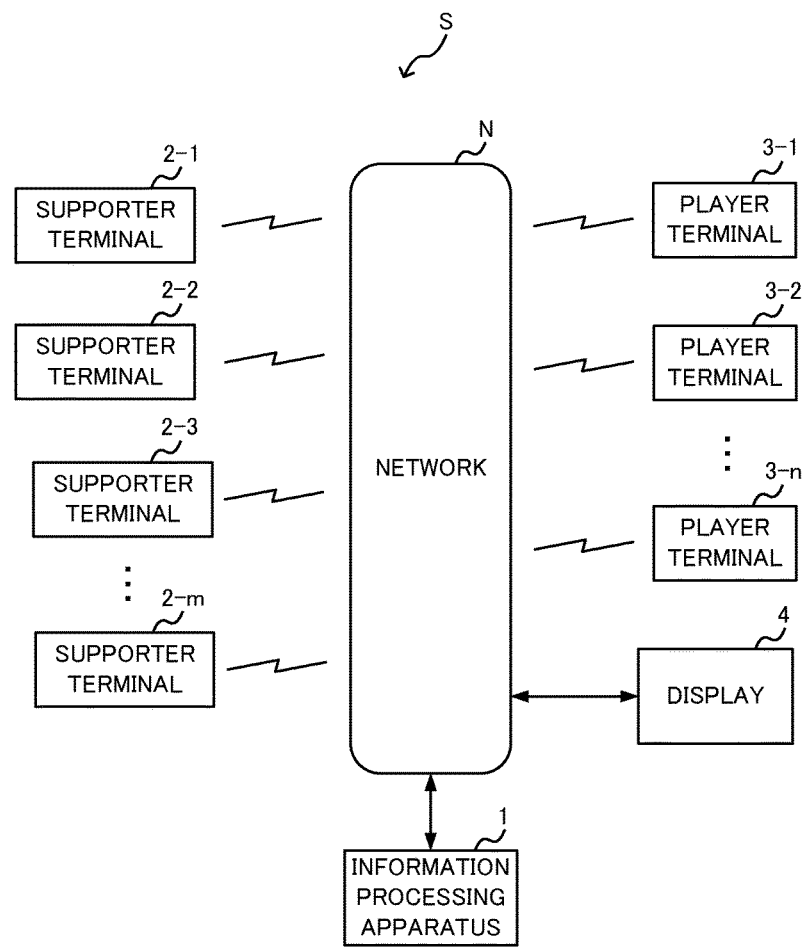
FIG. 1 is a diagram illustrating an outline of an information processing system.

FIG. 1 is a diagram illustrating an outline of an information processing system S. The information processing system S is a system for enabling a supporter, who views a video of a sports competition such as a soccer, rugby, baseball, or tennis match on an information terminal, to transmit a support message to a player, transmit a cheering sticker that requires a fee to the player, or present the player with money and goods for support, while viewing a video of the competition or text indicating the situation in the competition. The competition may be a competition taking place in a soccer field, a rugby field, a baseball field, or the like, or may be an e-sport. The player includes an athlete competing in the competition, a team competing in the competition, the staff of the team, and the like.

The information processing system S includes an information processing apparatus 1, a plurality of supporter terminals 2, and a plurality of player terminals 3. As shown in FIG. 1, the information processing system S may further include a display device 4. The display device 4 is a large display installed in a venue where the competition is held.

The information processing apparatus 1 enables transmission and reception of various messages between a plurality of supporters using a plurality of supporter terminals 2 and a plurality of players using a plurality of player terminals 3. The supporter is a person who watches the competition and gives support goods to the player. The support goods are tangible or intangible goods such as support messages, cheering stickers, merchandise, gift certificates, or money used for cheering on the player, for example.

The information processing apparatus 1 acquires at least one of (i) moving image data created by shooting the competition with a camera installed in the competition venue or (ii) text data indicating the situation in the competition, and streams content including at least one of the acquired moving image data or text data to the plurality of supporter terminals 2 and the plurality of player terminals 3. The information processing apparatus 1 transmits and receives various types of data to and from the plurality of supporter terminals 2 and the plurality of player terminals 3 while streaming the content. The data transmitted/received by the information processing apparatus 1 to and from the plurality of supporter terminals 2 and the plurality of player terminals 3 is support information indicating (i) the support message and (ii) the content of a support gift which is the support goods such as merchandise, gift certificates, money, or the like, for example. In the following description, a case where the content is moving image data is described, but the content may be text data or may include both moving image data and text data.

The supporter terminals 2 and the player terminals 3 are information terminals having a function of displaying text and an image, a function of accepting an operation of the supporter or the player, and a communication function, and are smartphones, tablets, or personal computers, for example. The plurality of supporter terminals 2 and the player terminals 3 transmit and receive data to and from the information processing apparatus 1 via a network N. Although FIG. 1 shows m units of the supporter terminals 2 (where, m is an integer) and n units of the supporter terminals 3 (where, n is an integer), the number of supporter terminals 2 and the number of player terminals 3 capable of communicating with the information processing apparatus 1 are arbitrary.

The supporter terminals 2 and the player terminals 3 include a central processing unit (CPU) and memories such as a read only memory (ROM) and a random access memory (RAM), and may display various types of texts and images including the support information by executing application programs stored in the memories by the CPU, or may display various types of texts and images by executing a web application program provided by the information processing apparatus 1.

When a player is competing in a competition, he/she cannot watch the screen of his/her player terminal 3 during the competition. Therefore, when the support information for the player is transmitted from the information processing apparatus 1, the player terminal 3 may output the content of the transmitted support information by voice. Further, after the competition is over, the player can check, on the screen of the player terminal 3, the content of the support given to him/her during the competition.

[Screen Examples of the Supporter Terminal 2 and the Player Terminal 3]

Figure 2:
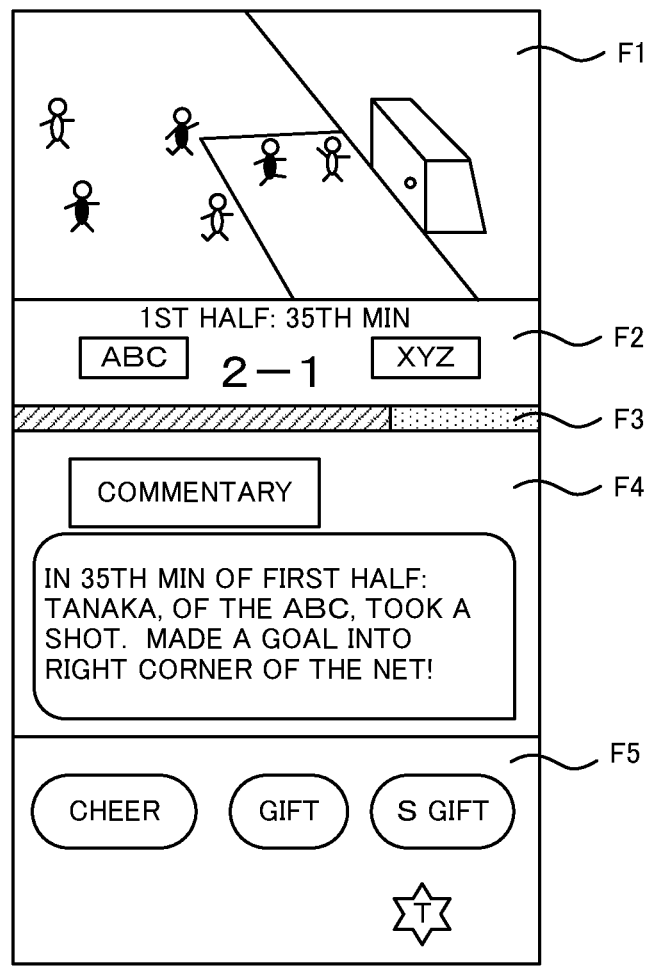
FIG. 2 is a diagram showing an example of a screen displayed on a supporter terminal and a player terminal.

FIG. 2 shows an example of a screen displayed on a supporter terminal 2 and a player terminal 3. In an image display area F1, a moving image based on the moving image data created by shooting the competition is displayed. In the example shown in FIG. 2, a moving image of the moment when a goal was scored in a soccer competition is displayed.

Below the image display area F1, a score display area F2 indicating the score of the competition is displayed. In the example shown in FIG. 2, it is shown that the ABC and the XYZ are competing against each other, and the ABC is in the lead 2-1 at the 35th minute of the first half.

Below the score display area F2, a support amount display area F3 indicating the ratio of support amounts given to the respective teams is displayed. The support amount is represented by the number of support messages transmitted to the respective teams or players who belong to the respective teams, or the number of support goods or the amount of support money given to the players by a plurality of supporters who use the supporter terminals 2. The shaded area on the left side in the support amount display area F3 indicates the proportion of the support amount for the ABC, and the halftone dot area on the right side in the support amount display area F3 indicates the proportion of the support amount for the XYZ. The support amount may be a numerical value calculated by multiplying the number of support messages, support goods, and the amount of support money by different weighting factors, and then adding them together.

Below the support amount display area F3, an information display area F4 for displaying text information or image information such as a text commentary related to the content of the competition and a message or the like transmitted by the supporter is displayed. FIG. 2 shows a state in which the text commentary is displayed. In the information display area F4, information indicating the timing at which a play to be commented on was performed (for example, an elapsed time from the start of the competition), the name of the player who performed said play, the name of the team which the player belongs to, and the text commentary including the content of said play is displayed. The text commentary may be text entered by a person watching the competition in real time using another information terminal, or may be text generated by a computer (for example, the information processing apparatus 1 or the supporter terminal 2) which analyzes a moving image of the competition.

In the information display area F4, an image indicating a player who has performed a predetermined play (e.g., a shot or a free kick) may be displayed. The image is an image of a player card that includes at least a part of the player's name, face image, or profile, for example. When the supporter presses the image, the supporter terminal 2 may transmit the support goods.

An operation area F5 for accepting an operation of the supporter is displayed below the information display area F4. In the example shown in FIG. 2, a button image is displayed for the supporter to perform an operation of giving support goods to the player. A "Cheer" button image is an image used by the supporter to perform an operation of transmitting the support message.

When the "Cheer" button image is pressed, the supporter terminal 2 transmits a preset message or image to the information processing apparatus 1. The supporter terminal 2 may select the message or the image on the basis of the content of the moving image displayed in the image display area F1, or may select the message or the image on the basis of the content of the text commentary displayed in the information display area F4. In addition, when the "Cheer" button image is pressed, the supporter terminal 2 may display a plurality of candidates for the message or the image to be transmitted and transmit a message or an image selected by the supporter to the information processing apparatus 1. Alternatively, the supporter terminal 2 may display a screen for a supporter to enter his/her unique support message, and transmit the support message entered by the supporter. Note that, in response to pressing of the "Cheer" button image, the support amount indicated in the support amount display area F3 is increased.

When the supporter terminal 2 transmits the support message to the information processing apparatus 1, the information processing apparatus 1 transmits the support message to at least one of the plurality of supporter terminals 2, the plurality of player terminals 3, or the display device 4. Although details will be described later, the information processing apparatus 1 identifies which play a support message is for or which player a support message is for on the basis of the content of the moving image displayed in the image display area F1 or the content of the text commentary displayed in the information display area F4, for example. The supporter terminal 2 adds a message indicating that the support message is for the identified play or player, and transmits the support message to at least one of the plurality of supporter terminals 2, the plurality of player terminals 3, or the display device 4.

Figure 3:
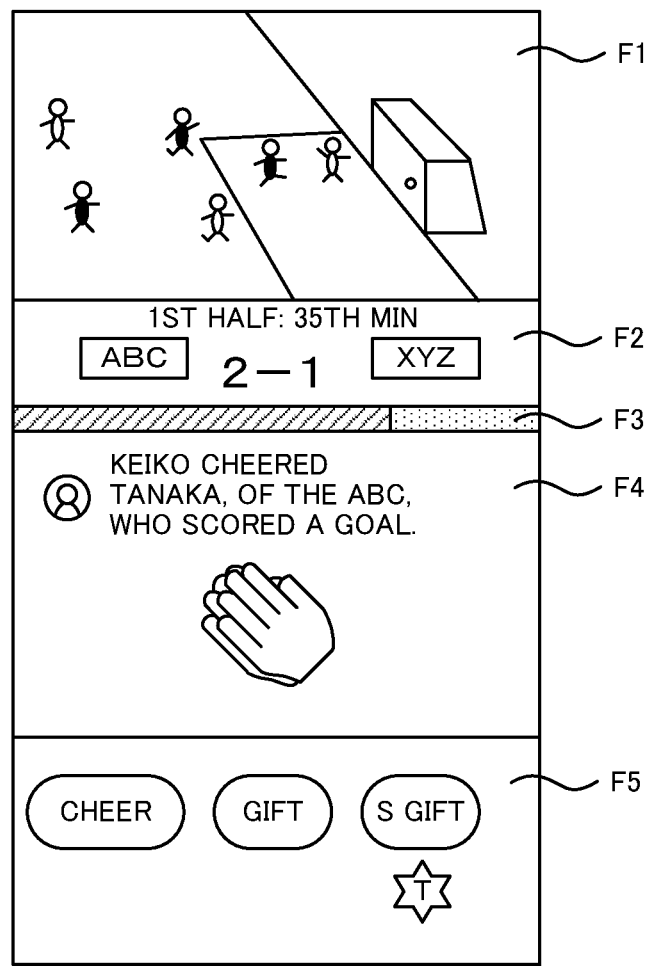
FIG. 3 is a diagram showing an example of a screen displayed when a supporter presses a "Cheer" button image.

FIG. 3 is a diagram showing an example of a screen displayed when the supporter presses the "Cheer" button image. In the information display area F4, text indicating that the supporter (Keiko) cheered on the player (Tanaka) is displayed. FIG. 3 shows the screen displayed on the plurality of supporter terminals 2, and the same screen may also be displayed on the plurality of player terminals 3.

In the plurality of player terminals 3, the operation area F5 need not be displayed, and it is acceptable for only the information display area F4 to be displayed. It may be designed such that the supporter using the supporter terminal 2 and the player using the player terminal 3 can set which area among the image display area F1 to the operation area F5 is to be displayed. The texts and images displayed in the information display area F4 are displayed in a timeline format, and the supporter using the supporter terminal 2 or the player using the player terminal 3 can view past texts and images.

Referring back to FIG. 2, a "Gift" button image is an image used by the supporter to perform an operation of giving gifts such as merchandise, gift certificates, money, or the like to the player. When the "Gift" button image is pressed, the supporter terminal 2 transmits support information indicating the content of a preset gift to the information processing apparatus 1. When the "Gift" button image is pressed, the supporter terminal 2 may display a plurality of gift candidates and transmit support information indicating the content of the gift selected by the supporter from among the plurality of gift candidates to the information processing apparatus 1. Further, the supporter terminal 2 may display a screen for selecting which player the gift is to be given to, and transmit the support information to the information processing apparatus 1 in association with information (for example, the player's name) for identifying the player selected by the supporter.

Note that, in response to pressing of the "Gift" button image, the amount of support indicated in the support amount display area F3 is increased. At this time, it may be designed such that the amount of support is increased by a larger number when the "Gift" button image is pressed once than when the "Cheer" button image is pressed once.

When the supporter terminal 2 transmits the supporter information to the information processing apparatus 1, the information processing apparatus 1 transmits, to a player terminal 3 of a player who is the recipient of the gift, supporter information indicating that the gift has been given to him/her. Similarly to the support message, the information processing apparatus 1 may transmit the support information indicating the content of the gift to the plurality of supporter terminals 2 and the plurality of player terminals 3. If the support information transmitted from the supporter terminal 2 does not include information indicating the player who is the recipient of the gift, the control part 13 of the information processing apparatus 1 may identify which player the gift is for on the basis of at least one of the content of the moving image displayed in the image display area F1 or the content of the text commentary displayed in the information display area F4.

The control part 13 of the information processing apparatus 1 may cause a storage medium (for example, the storage 12) to store the content of the gift in association with the supporter who gives the gift to the player and the player who receives the gift, and may transmit a list of the gifts to the player terminals 3 used by each of the plurality of players when the competition ends. Further, the information processing apparatus 1 may transmit data requesting the delivery of the gift to the player to the server of a company which provides the gift. Further, the information processing apparatus 1 may execute a process of charging an expense corresponding to the gift to the supporter who gave the gift to the player.

Figure 4:
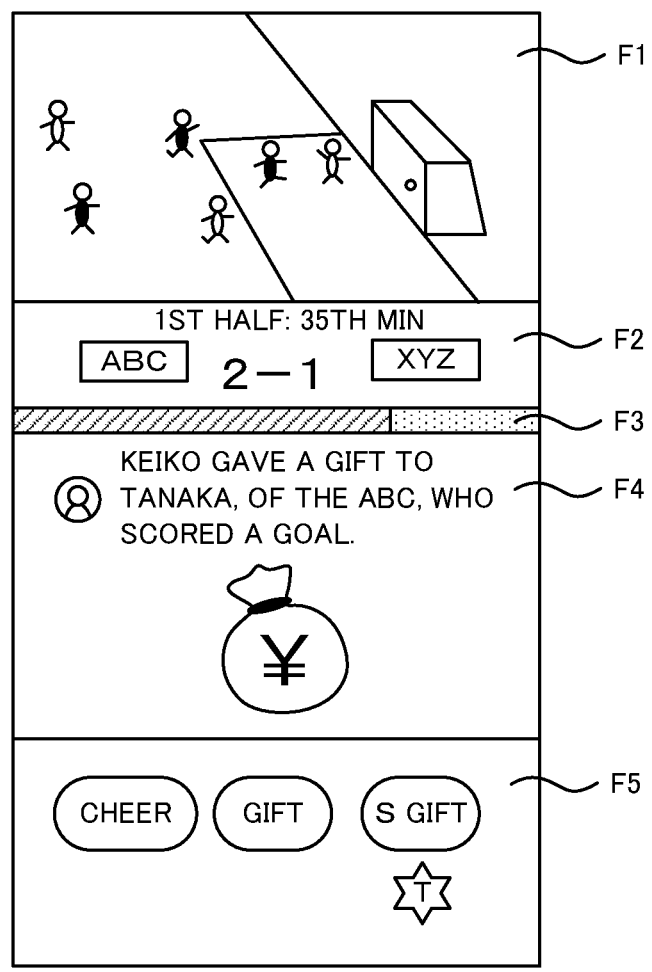
FIG. 4 is a diagram showing an example of a screen displayed when the supporter presses a "Gift" button image.

FIG. 4 is a diagram showing an example of a screen displayed when the supporter presses the "Gift" button image. In the information display area F4, a text indicating that the supporter (Keiko) presented the player (Tanaka) with the gift is displayed. Although FIG. 4 shows a screen displayed on the plurality of supporter terminals 2, the same screen may be displayed on the plurality of player terminals 3. The screen indicating that the gift was given may be displayed only on the supporter terminal 2 of the supporter who gave the gift and the player terminal 3 of the player to whom the gift was given.

Referring back to FIG. 2, similarly to the "Gift" button image, an "S Gift" button image is an image used by the supporter to give a gift to the player, but is different from the "Gift" button image in that a sponsor bears a part of the gift. In the example shown in FIG. 2, a logo image indicating the name of the sponsor is displayed below the "S Gift" button image. When the "S Gift" button image is pressed, the supporter terminal 2 transmits the support information indicating the content of a preset Gift to the information processing apparatus 1. The supporter terminal 2 may transmit support information including the sponsor name to the information processing apparatus 1.

Figure 5:
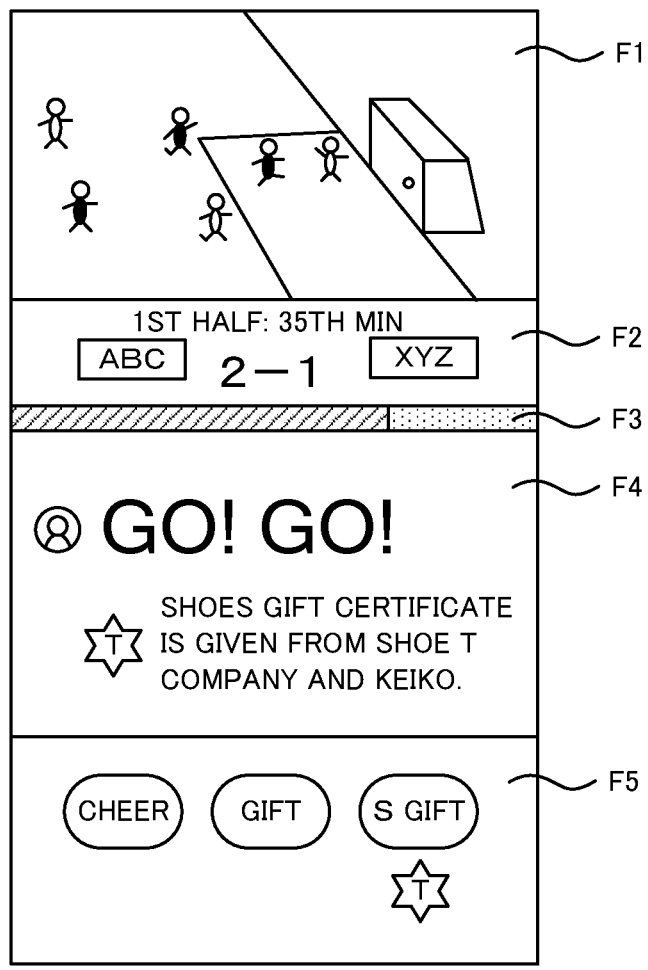
FIG. 5 is a diagram showing an example of a screen displayed when the supporter presses an "S Gift" button image.

FIG. 5 is a diagram showing an example of a screen displayed when the supporter presses the "S Gift" button image. In the information display area F4, the sponsor name, the supporter name, and the content of the gift are displayed together with a support message "GO! GO!" Similarly to the screen shown in FIG. 4, the screen shown in FIG. 5 may be displayed on the plurality of supporter terminals 2 and the plurality of player terminals 3, or the screen shown in FIG. 5 may be displayed only on the supporter terminal 2 of the supporter who gave the gift and the player terminal 3 of the player to whom the gift was given.

For example, when any one of the button images displayed in the operation area F5 is selected, the supporter terminal 2 may display a list of players who are on the team that is playing in the competition of which the moving image is displayed, and allow the supporter to select a player who is the target of his/her support. When the supporter selects the player, the supporter terminal 2 transmits a support request including information for identifying the selected player to the information processing apparatus 1.

In addition, the information processing apparatus 1 may store the content of the gift in the storage medium in association with the supporter who gives the gift, the sponsor of the gift, and the player who receives the gift, and transmit a list of the gifts to the player terminals 3 used by each of the plurality of players at the time when the competition ends. Further, the information processing apparatus 1 may transmit, to the server of the sponsor, data for requesting that a gift be sent to a player. In addition, the information processing apparatus 1 may execute a process of charging an expense corresponding to the gift, excluding an expense to be borne by the sponsor from among the entire expense corresponding to the gift.

The screen displayed on the player terminal 3 may be the same as the screen displayed on the supporter terminal 2, but in the screen displayed on the player terminal 3, only the content of support may be displayed in a timeline format. The player terminal 3 may select and display only the content of the support information for the player who uses the player terminal 3 among the plurality of pieces of support information transmitted from the information processing apparatus 1, or the player terminal 3 may output voice indicating the content of the support information.

In addition, the player terminal 3 may output the support information by voice in a preset competition time period, and may display the support information on a screen in a time period (for example, halftime or after the competition) other than the competition time period. The player terminal 3 may output the support information in a competition time period specified on the basis of an instruction from the information processing apparatus 1.

[Configuration of the Information Processing Apparatus 1]

Figure 6:
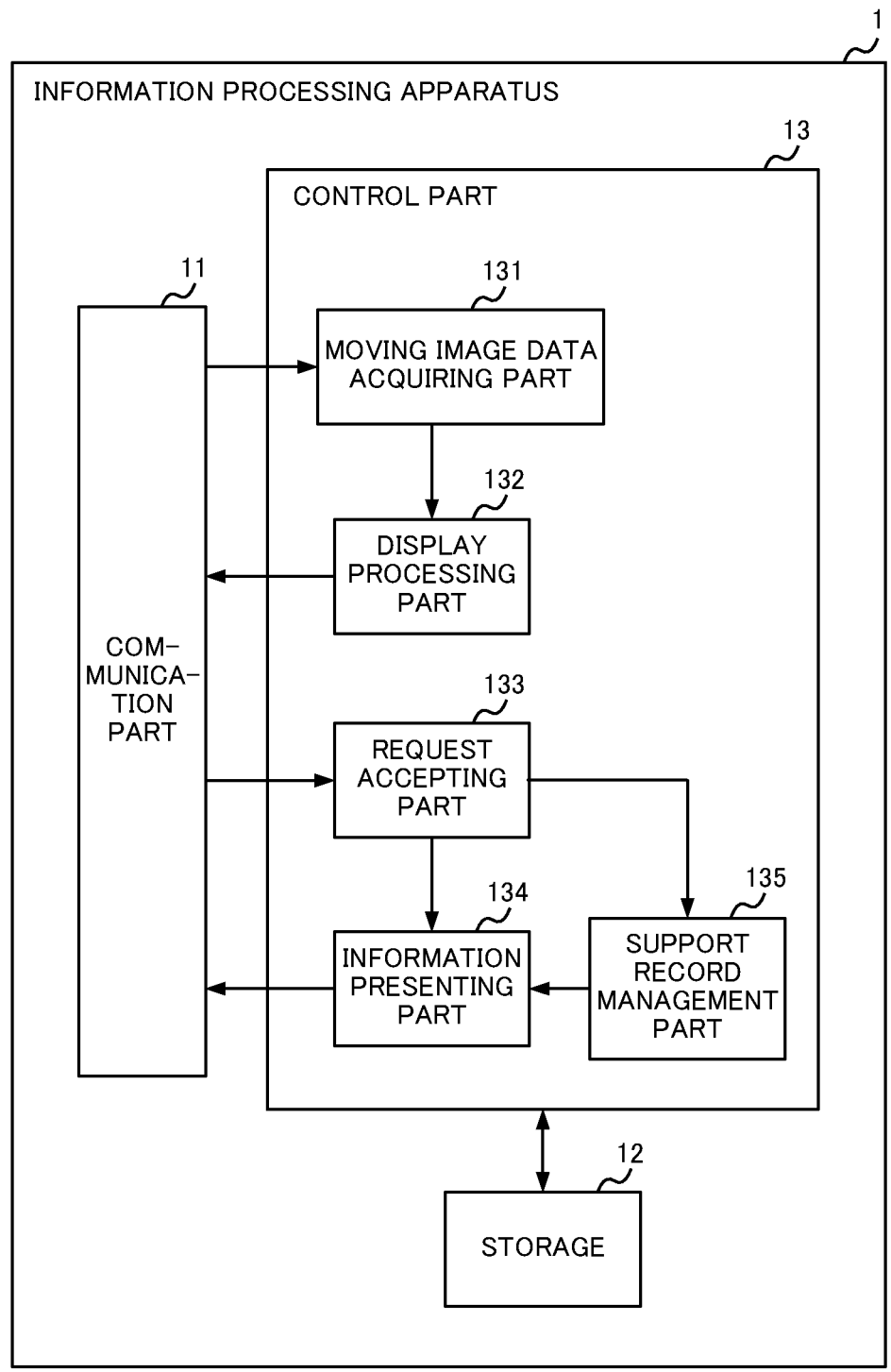
FIG. 6 is a diagram showing a configuration of an information processing apparatus.

FIG. 6 shows a configuration of the information processing apparatus 1. The information processing apparatus 1 includes a communication part 11, a storage 12, and a control part 13. The control part 13 includes a moving image data acquisition part 131, a display processing part 132, a request accepting part 133, an information presenting part 134, and a support record management part 135.

The communication part 11 has a communication interface for transmitting and receiving various types of data to and from the supporter terminal 2 and the player terminal 3 via a network N. For example, the communication part 11 receives moving image data from a camera installed in the competition venue, and inputs the received moving image data to the moving image data acquisition part 131. Further, the communication part 11 receives various types of data received from the supporter terminal 2 and the player terminal 3, and provides a notification about the received data to each unit of the control part 13. For example, the communication part 11 receives support request data indicating the content of the support goods received from the plurality of supporter terminals 2, and inputs the received support request data to the request accepting part 133.

The storage 12 includes a storage medium such as a ROM, a RAM, and a solid state drive (SSD). The storage 12 stores a program executed by the control part 13. Further, the storage 12 stores information (e.g., the supporter's name and a supporter identification number) for identifying a supporter who can give support goods to a player, and information (e.g., the player's name, a player identification number, and a name of the team he/she is on) for identifying a player who can receive the support goods. Further, although the details will be described later, the storage 12 stores (i) the supporter who gave the support goods, (ii) the player who received the support goods, and (iii) information indicating the content of the support goods, in association with each other.

The control part 13 includes a CPU, for example. By executing the program stored in the storage 12, the control part 13 functions as the moving image data acquisition part 131, the display processing part 132, the request accepting part 133, the information presenting part 134, and the support record management part 135.

The moving image data acquisition part 131 acquires moving image data of a competition through the communication part 11. The moving image data acquisition part 131 inputs the acquired moving image data to the display processing part 132.

The display processing part 132 causes the display unit to display content including at least one of a moving image of the competition or text indicating the situation in the competition. Specifically, the display processing part 132 transmits the moving image data input from the moving image data acquisition part 131 to at least one of the plurality of supporter terminals 2, the plurality of player terminals 3, or the display device 4, thereby displaying the moving image on a display included in at least one of the plurality of supporter terminals 2, the plurality of player terminals 3, or the display device 4. As shown in FIG. 2, the display processing part 132 causes the moving image to be displayed in a first area in the display unit of the supporter terminal 2, the player terminal 3, and the like, and causes an operation image for selecting the support goods to be displayed in a second area different from the first area in the display unit.

When the moving image data acquisition part 131 acquires a plurality of pieces of moving image data captured from a plurality of different positions, the display processing part 132 may select moving image data including a predetermined subject and transmit the selected moving image data. The display processing part 132 transmits moving image data in which a player specified in advance by a supporter is mainly shown, to a supporter terminal 2 used by the supporter who specified the player, for example. Further, the display processing part 132 may transmit the moving image data including a ball used in a competition to the plurality of supporter terminals 2, the plurality of player terminals 3, and the display device 4.

The request accepting part 133 accepts, from a supporter of the competition, a support request for selecting support goods to cheer on a player performing in the competition. For example, the request accepting part 133 accepts support requests from a plurality of supporter terminals 2 used by a plurality of supporters. The request accepting part 133 accepts a support request by acquiring, via the communication part 11, the support request data transmitted by the supporter terminal 2 when the supporter using the supporter terminal 2 presses the button image, shown in the operation area F5 of FIG. 2, for performing an operation of giving the support goods. The request accepting part 133 adds information for identifying a supporter who uses the supporter terminal 2 that has transmitted the support request data, and provides the information presenting part 134 with a notification of having accepted the support request.

The request accepting part 133 may accept, from the supporter, a selection operation of selecting one or more players from among a plurality of players. Specifically, the request accepting part 133 accepts the selection operation by acquiring the support request including the information for identifying the player when the supporter performs the operation of selecting the player who is to be a recipient of the support goods in the screen displayed on the supporter terminal 2. The request accepting part 133 provides the information for identifying the selected player to the information presenting part 134.

The information presenting part 134 presents various types of information by transmitting various types of information to at least one of the plurality of supporter terminals 2, the plurality of player terminals 3, or the display device 4. The information presenting part 134 may input information to be presented to the display processing part 132, and present the information together with the moving image data via the display processing part 132.

The information presenting part 134 presents the support information to the plurality of supporters or the plurality of players by transmitting the support information to the plurality of supporter terminals 2 used by the plurality of supporters or the plurality of player terminals 3 used by the plurality of players. The support information is information indicating a support message generated in response to the supporter pressing the "Cheer" button image, or information indicating the content of a gift to be given to the player in response to the supporter pressing the "Gift" button image or the "S Gift" button image.

The support information may be information (e.g., the information shown in the support amount display area F3 in FIG. 2) corresponding to the number of times the supporter performs an operation for giving support goods. The information presenting part 134 may transmit, to the supporter terminal 2 or the player terminal 3, the content of the play performed at a timing when the supporter has determined to give support goods, or the timing at which the play was performed, together with the supporter information.

In other words, the information presenting part 134 presents (i) any one of the plurality of plays in the competition and (ii) the support information corresponding to the support goods in association with each other, to at least one of the player or other supporters. For example, the information presenting part 134 selects a play to be cheered for from among a plurality of plays on the basis of a relationship between a timing of the play indicated by the moving image and a timing at which the request accepting part 133 accepts the support request, and associates the play to be cheered for with the support information. The timing of the play indicated by the moving image is a timing at which a player makes a predetermined play, such as the timing of a shot, a free kick, or a goal kick in a soccer match, a timing of a try or a conversion kick in a rugby match, or the like, for example.

The images of such a plurality of plays are sequentially included in the moving image. The information presenting part 134 selects, as the play to be cheered for, a play performed at a timing closest to the timing at which the request accepting part 133 accepted the support request, from among the plurality of plays, for example. The information presenting part 134 associates at least one of a name of the selected play, a player who performed the specified play, or the timing at which the specified play was performed with the support information, and presents them to the plurality of supporter terminals 2, the plurality of player terminals 3, or the display device 4. The information presenting part 134 may present an image indicating the type of the specified play and the name of the player who performed that play, on the basis of instructions (for example, an instruction from an administrator) from another external device.

In the case of the example shown in FIG. 4, the information presenting part 134 identifies that the play performed at the timing closest to the timing at which the supporter pressed the "Gift" button image was when Tanaka fired a shot, and presents the support information "Keiko gave a gift to Tanaka, of the ABC, who scored a goal." Since the information presenting part 134 operates in this manner, a player or a supporter who views the support information can easily grasp which play the support is for.

The information presenting part 134 may store the support information in the storage 12 in association with at least one of the name of the specified play, the player who performed the specified play, or the timing at which the specified play was performed. After the competition ends, the information presenting part 134 may present the stored information to the player terminal 3 in response to a request from the player terminal 3. For example, when there is a request for presentation of the support information from a player terminal 3, the information presenting part 134 transmits, to the player terminal 3, only the support information addressed to a player who uses said player terminal 3.

FIG. 7 is a diagram showing an example of support information stored in the storage 12. In the example shown in FIG. 7, a player ID, a player's name, the content of the gift, the date and time when the support is performed, a supporter ID, and a sponsor name are associated with each other. The storage 12 may further store the content of the message transmitted by the supporter in association with the player ID and the supporter ID. Further, the storage 12 may store information for identifying a play corresponding to the timing at which the support is performed, in association with the support date and time or instead of the support date and time. By referencing various types of stored information in this manner, the information presenting part 134 can notify the player about the content of support given to the player, after the competition is over.

The information presenting part 134 may present (i) the supporter information and (ii) the player to be supported in association with each other to the supporter terminal 2 and the player terminal 3. The information presenting part 134 presents the support information in association with a player indicated in the notification from the request accepting part 133 as a player designated by the supporter, for example. When the supporter selects a player to be supported in the supporter terminal 2, the request accepting part 133 may acquire a support request including information for identifying the selected player from the supporter terminal 2, and the information presenting part 134 may present the support information in association with the selected player on the basis of the selection operation performed by the supporter. Specifically, the information presenting part 134 causes the supporter terminal 2 or the player terminal 3 to display at least one of a name, nickname, or uniform number of the player selected by the supporter together with the supporter information.

The information presenting part 134 may select a player included in a moving image from among a plurality of players when the request accepting part 133 accepts the support request, and present the support information in association with the selected player. The information presenting part 134 may identify the player included in the moving image on the basis of the number on the uniform of the player included in the moving image, or may identify the player by performing facial recognition. For example, as shown in FIGS. 3 to 5, if the information presenting part 134 includes the player's name included in the moving image in an image or text indicating that the support was performed, other supporters or players can know which player the support was for.

The information presenting part 134 may transmit the same support information to only some of the player terminals 3, instead of transmitting the same support information to all of the player terminals 3. For example, the information presenting part 134 presents support information for the selected player to the selected player. The information presenting part 134 may present the support information for the selected player not only to the selected player but also to a plurality of players associated with the selected player in advance. The information presenting part 134 transmits the support information to the player terminals 3 used by other players or the staff belonging to the same team as the selected player, as the plurality of players associated with the selected player in advance, for example. By having the information presenting part 134 present the support information to other players, other players are motivated to perform a play so that they themselves can also receive support.

The information presenting part 134 may present the support information to a player by transmitting the support information only to the player terminal 3 used by (i) the player selected by the supporter as the recipient of the support goods or (ii) the player included in the moving image at the point in time when the request accepting part 133 accepts the support request. Since the information presenting part 134 operates in this manner, the player does not need to see the support given to other players.

The information presenting part 134 may transmit, to the player terminal 3 of the player whom the supporter cheers for, support information with content that differs from support information transmitted to the player terminals 3 of other players. For example, the information presenting part 134 presents the support information to the player terminal 3 of the player who has become the target of support together with information that informs the player who is using the player terminal 3 that he/she is the target of the support. Since the information presenting part 134 operates in this manner, even when a large amount of support information is displayed on the player terminal 3 of the player, the player can easily identify the support information for himself/herself.

The information presenting part 134 may present the support information to the player by transmitting the support information as information to be displayed on the display device 4 installed in the venue where the competition is held. At this time, the information presenting part 134 may select information suitable for being displayed on the display device 4 from among the support information displayed on the player terminal 3, and transmit only the selected information to the display device 4.

The information presenting part 134 causes the display device 4 to display only images and characters that can be displayed in a predetermined size or more without displaying a sentence with a predetermined number of characters or more, among the support information, for example. The information presenting part 134 may reference information of a screen size and a screen shape (for example, aspect ratio) of the display device 4 stored in the storage 12, and determine the layout and the display size of an area for displaying the support information according to the size or the shape of the display device 4. The information presenting part 134 may transmit support information corresponding to the determined layout and display size.

The information presenting part 134 may determine the layout and the display size of the area to be displayed on the basis of information indicating a state of a venue in which the display device 4 is installed. The information indicating the state of the venue includes the size of the venue, the brightness of the venue, and loudness of cheers in the venue, for example. The information presenting part 134 acquires the information indicating the state of the venue from the display device 4 or another device via the communication part 11, for example, and determines the layout and the display size on the basis of the acquired information. Since the information presenting part 134 operates in this manner, the supporter information displayed on the display device 4 can be recognized by people in the competition venue.

The display device 4 may determine at least one of the layout or the display size of the area for displaying the support information on the basis of at least one of the size of the display device 4, the shape of the display device 4, or the state of the venue, and display the support information in the determined layout or display size. The display device 4 may transmit at least one of the size of the display device 4, the shape of the display device 4, or the state of the venue to the information processing apparatus 1, and may receive the support information having the content suitable for the display device 4 from the information processing apparatus 1.

The information presenting part 134 may present the support information in a mode determined on the basis of the number of support requests accepted from the plurality of supporter terminals 2. For example, as shown in the support amount display area F3 of FIG. 2, the information presenting part 134 presents, as the support information, a figure of an area that corresponds to the number of operations performed by the supporter to give the support goods to the player, or a figure of a number that corresponds to the number of operations performed by the supporter to give the support goods to the player. Since the information presenting part 134 presents such support information, the supporter can recognize which team has a greater support amount. This motivates the supporter to further cheer on the team which he/she supports, so as not to lose out to the opponent team. Further, as for the player, his/her motivation for play is improved since the player can recognize that he/she is being supported.

The information presenting part 134 may determine the mode of the support information on the basis of the accumulated number of support requests accepted by the request accepting part 133 since the competition has started, or may determine the mode of the support information on the basis of the number of support requests per unit time (for example, one minute). The information presenting part 134 may determine whether the total number is to be used or the number per unit time is to be used, according to setting content set by the respective supporter terminals 2 or the player terminal 3. Further, the information presenting part 134 may present the total number or the number of support requests per unit time.

When the support information shown in the information display area F4 in FIGS. 3 to 5 is displayed, the information presenting part 134 may change the display mode on the basis of the number of support requests. For example, when a plurality of support requests are accepted from a plurality of supporter terminals of a number equal to or greater than a threshold value within a predetermined time, the information presenting part 134 presents, for the plurality of support requests, a number of pieces of support information smaller than the number of the plurality of support requests. At this time, the information presenting part 134 may change the size or color of the image or text presented as the support information according to the number of supporters summarized into one piece of support information. Since the information presenting part 134 operates in this manner, it is possible to prevent the support information from being switched on the screen of the supporter terminal 2, the player terminal 3, or the display device 4 at high speed when a large number of supporters give support goods. Therefore, it becomes easier for the supporter or the player to recognize the amount of support.

In the case where a sponsor is associated with the support goods, the information presenting part 134 may present the support information in association with information indicating the sponsor, as described with reference to FIGS. 2 and 5. The information indicating the sponsor is the sponsor's name, trademark, or product name, and is stored in the storage 12 in association with the sponsor in advance, for example. Since the information presenting part 134 presents such support information, the sponsor can expect advertising effects and the player can receive support goods that are better in quality and quantity than the support goods that are given just by the supporter.

Instead of transmitting the support information to the player terminal 3 during the competition, or in addition to transmitting the support information to the player terminal 3 during the competition, the information presenting part 134 may transmit the support information to the player terminal 3 during and after the competition by referencing the support information shown in FIG. 7 and present the support information indicating the content of the support for each player to the player terminal 3 of the player corresponding to the support information. Since the information presenting part 134 notifies the player of such information, the player can easily transmit a thank-you message to the supporter. This brings about a good relationship between the supporter and the player and leads to the supporter continuing to support the player.

When presenting the support information to the player terminal 3, the information presenting part 134 may cause the player terminal 3 to display a screen for selecting the content of gratitude for the supporter. For example, the information presenting part 134 causes the player terminal 3 to display a face image of the player, points that can be used in an event held by the team to which the player belongs, a ticket to a competition of the team to which the player belongs, and the like, and transmits information indicating the content of the gratitude selected by the player to the supporter terminal 2 of the supporter. Since the information presenting part 134 operates in this manner so that the player can show his/her appreciation to the supporter, the supporter is motivated to given even more support.

Further, by referencing the information indicating the support content as shown in FIG. 7, the information presenting part 134 may present, to the supporter terminal 2 or the player terminal 3, information indicating how much support is given during the competition and how many gifts are given to the player. The information presenting part 134 may present information aggregated for each team or the content of support aggregated for each player or each play. By looking at such information, a manager of the team can grasp which player or which play receives a lot of support and use this information to guide players.

If the support goods are to provide the player with money or a monetary value, a business operator who provides services using the information processing apparatus 1 needs to acquire money from the supporter and provide the acquired money to the player. Therefore, in response to the information presenting part 134 presenting the support information to the player, the support record management part 135 stores the amount of money corresponding to a value of the support in the storage 12 in association with the supporter who made the support request. The support record management part 135 may store the amount of money corresponding to the value of the support in association with the player to be supported by the supporter. The value of the support may be (i) the monetary value of the support goods, or (ii) an amount of money which is the sum of the monetary value of the support goods and a monetary value determined on the basis of other factors such as the support amount, the number of support messages, the number of viewers of the player, or the likes.

If the sponsor bears a part or all of the value of the support, the support record management part 135 may store, in the storage 12, a part or all of the value of the support corresponding to the support information in association with a sponsor who has been associated with the support information which was presented in response to the information presenting part 134 presenting the support information to the player. Then, the support record management part 135 may notify the sponsor about the value of the support which the sponsor bears, and notify the player about the value of the support and the sponsor in association with each other. Since the support record management part 135 notifies the player of such information, the player is motivated to actively use the sponsor's products, and therefore the advertising effect of the sponsor is improved.

The support record management part 135 may store a support history of a supporter in the storage 12, and rank the supporter on the basis of a past record of support given by the supporter. The past record of support is represented by the number of times support was given, the content of the gifts given to the player, or data quantified on the basis of an amount spent on gifts, for example. The information presenting part 134 may display a screen for each rank of the supporter, or may change the type of image displayed when the supporter transmits the support message. Since the information presenting part 134 and the support record management part 135 operate in this manner, the supporter is motivated to upgrade his/her rank, and therefore the amount of support given by the supporter can be increased.

Further, the support record management part 135 may store, in the storage 12, a past record of having received support for each team. In this case, the support record management part 135 may aggregate and output the past record of support which each team has received for every predetermined period (e.g., for one year), for example. By the support record management part 135 outputting such information, an external institution can evaluate the team according to the support record.

[Processing of the Information Processing System S]

Figure 8:
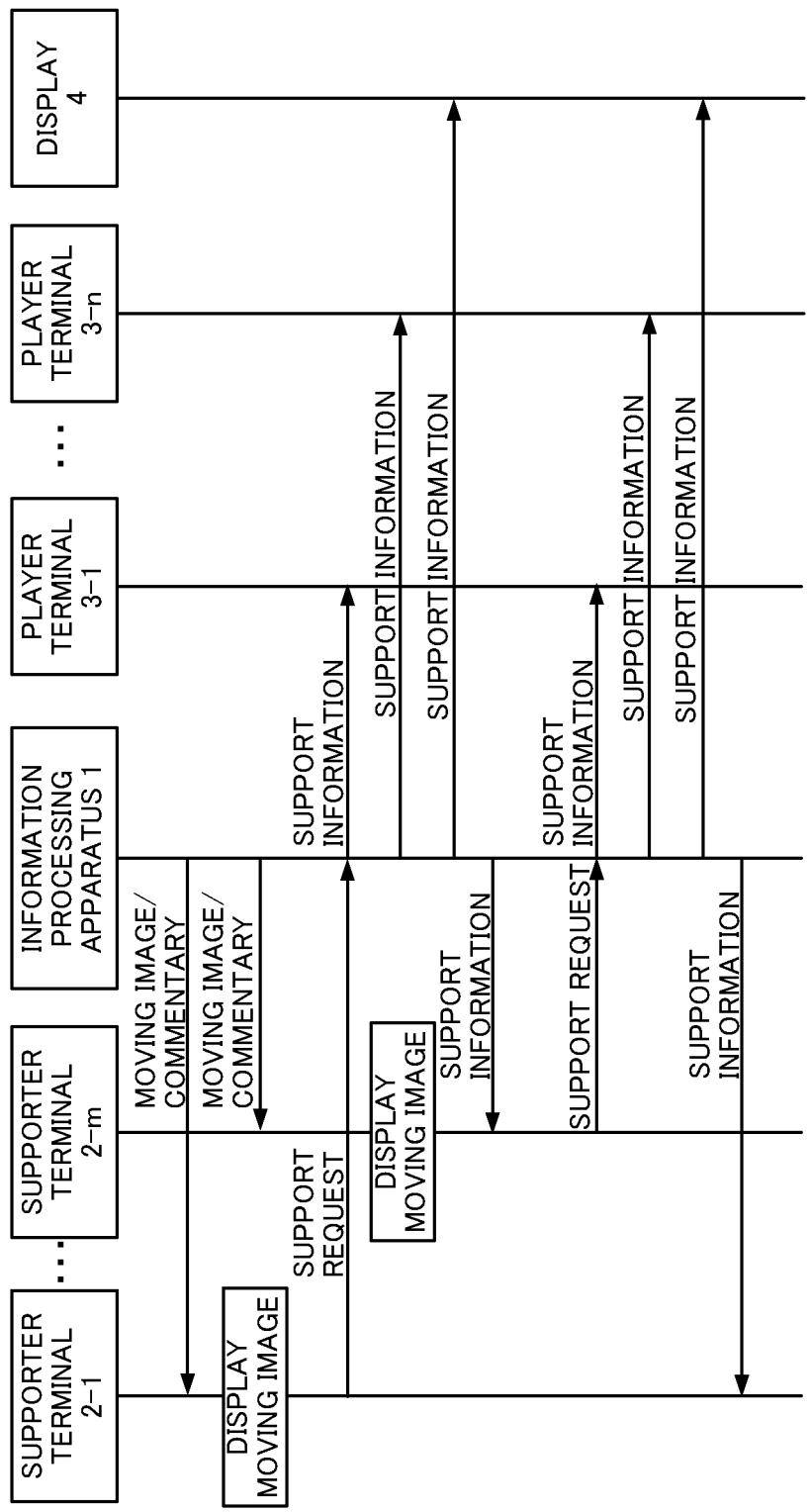
FIG. 8 is a sequence diagram showing processing of the information processing system.

FIG. 8 is a sequence diagram showing processing of the information processing system S. The sequence diagram shown in FIG. 8 starts from a state in which the information processing apparatus 1 is streaming moving image data of a competition to a plurality of supporter terminals 2.

The information processing apparatus 1 streams the moving image data to the plurality of supporter terminals 2, and streams a text commentary related to the competition to the plurality of supporter terminals 2 according to the situation of play. As shown in FIG. 2, the plurality of supporter terminals 2 display an image and the text commentary based on the received moving image data.

If a supporter using a supporter terminal 2-1 performs an operation to give support, the supporter terminal 2-1 transmits a support request to the information processing apparatus 1. The information processing apparatus 1 transmits support information indicating the content of the support corresponding to the received support request to a plurality of player terminals 3. The information processing apparatus 1 also transmits the support information to a plurality of supporter terminals 2 other than the supporter terminal 2-1 that transmitted the support request. When the plurality of player terminals 3 and the plurality of supporter terminals 2 receive the support information, the plurality of player terminals 3 and the plurality of supporter terminals 2 display the content of the support indicated by the received support information.

Similarly, if a supporter using a supporter terminal 2-*m* performs an operation to give support, the supporter terminal 2-*m* transmits a support request to the information processing apparatus 1. The information processing apparatus 1 transmits the support information to a plurality of player terminals 3 and a plurality of supporter terminals 2 other than the supporter terminal 2-*m*. Since the information processing system S operates in this manner, a plurality of players and the plurality of supporters can recognize the content of the support corresponding to the operation when each of the plurality of supporters performs the operation to give support. This not only improves the player's motivation but also brings excitement to the supporters.

[Variation Example]

Cases where the information processing apparatus 1 presents the support information to the supporter or the player by transmitting the support information to the supporter terminal 2 or the player terminal 3 have been described in the above description. However, by executing an application program with a built-in CPU, the supporter terminal 2 may function as an information processing apparatus.

Specifically, the supporter terminal 2 includes a CPU and a memory for storing the application program, and may function as: a display processing part that causes a display unit to display content including at least one of a moving image of a competition or text indicating the situation in the competition; a request accepting part that accepts, from a supporter of the competition, a support request for selecting support goods to cheer on a player performing in the competition; and an information presenting part that presents (i) any one of a plurality of plays in the competition and (ii) the support information corresponding to the support goods in association with each other to at least one of the player or other supporters, by executing the application program with the CPU. The supporter terminal 2 may have some or all of the functions of the information processing apparatus 1.

[Effects of the Information Processing System S]

As described above, the information processing apparatus 1 includes the request accepting part 133 that accepts, from the supporter of the competition, the support request for selecting support goods to cheer on the player performing the competition, while displaying the moving image of the competition on the supporter terminal 2 used by the supporter, and the information presenting part 134 that presents any one of the plurality of plays in the competition and the support information corresponding to the support goods in association with each other to at least one of the player or other supporters.

Since the information processing apparatus 1 has such a configuration, when the supporter who is watching the moving image of the competition performs an operation to give support, it is possible for the player or other supporters to recognize which play said operation to give support was performed for. As a result, the motivation of the player is improved, and the supporters get excited and have more fun in cheering.

Further, the supporter can give the support gift to the player simply by operating the supporter terminal 2. Since the information processing system S has such a function, the supporter can easily support the player, which brings more fun to the supporter and further improves the motivation of the player.

The present disclosure is explained based on the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. An information processing system comprising:
   a plurality of supporter terminals used by a plurality of supporters who support a competition;
   a plurality of player terminals used by a plurality of players who performs in the competition; and
   an information processing apparatus that presents, to the player terminals, support information including the content of support input in the supporter terminals, wherein
   the information processing apparatus includes:
   a display processing part that causes a display unit of the supporter terminals to display content including text indicating a predetermined play name corresponding to each play that one player performed and a name of the one player who performed the predetermined play, and an operation area for selecting support goods for supporting the one player, at each timing when the one player among the players performed the predetermined play;
   a request accepting part that accepts, from the supporter terminal, a support request for selecting support goods to cheer on the one player;
   a memory that stores information for identifying the supporter who uses the supporter terminal that sent the support request, information for identifying the one player who receives the support, and the support information corresponding to the support goods, in association with each other; and
   an information presenting part that presents, to the player terminal that is used by the one player, the support information corresponding to the support goods and the supporter who selected the support goods in association with each other after the competition ends.

2. The information processing system according to claim 1, wherein
   the player terminal outputs the support information by voice in a preset competition time period, and displays the support information on a screen in a time period other than the competition time period.

3. The information processing system according to claim 1, wherein
   the information processing system further comprises a display device installed in a venue where the competition is held, and
   the display device displays the support information in a layout or a display size based on at least one of a size of the display device, a shape of the display device, or a state of the venue.

4. The information processing system according to claim 1, wherein
   the information presenting part selects, from among a plurality of the players, the player included in the content when the request accepting part accepts the support request, and presents the support information in association with the selected player.

5. The information processing system according to claim 1, wherein
the request accepting part accepts, from the supporter, a selection operation of selecting one or more players from among a plurality of the players, and
the information presenting part presents the support information in association with the player selected on the basis of the selection operation.

6. The information processing system according to claim 5, wherein
the information presenting part presents the support information for the selected player to the selected player and to a plurality of the players associated with the selected player in advance.

7. The information processing system according to claim 1, wherein
the information presenting part presents the support information to the player by transmitting the support information as information to be displayed on a display device installed in a venue where the competition is held.

8. The information processing system according to claim 1, wherein
the information presenting part presents the support information to a plurality of the supporters by transmitting the support information to information terminals used by the plurality of supporters.

9. The information processing system according to claim 1, wherein
the information presenting part selects a play to be cheered for from the plurality of plays on the basis of a relationship between a timing of the play indicated by the content and a timing at which the request accepting part accepts the support request, and associates the play to be cheered for with the support information.

10. The information processing system according to claim 9, wherein
the information presenting part selects, as the play to be cheered for, a play performed at a timing closest to the timing at which the request accepting part accepted the support request, from among a plurality of the plays indicated by the content.

11. The information processing system according to claim 1, wherein
the request accepting part accepts the support request from a plurality of supporter terminals used by a plurality of the supporters, and
the information presenting part presents the support information in a mode determined on the basis of the number of support requests received from the plurality of information terminals.

12. The information processing system according to claim 11, wherein
the information presenting part presents, for a plurality of support requests, a number of pieces of support information smaller than the number of the plurality of support requests when the plurality of support requests are accepted from a plurality of supporter terminals of a number equal to or greater than a threshold value within a predetermined time.

13. The information processing system according to claim 1, wherein
the display processing part causes the content to be displayed in a first area in the display unit, and causes an operation image for selecting the support goods to be displayed in a second area different from the first area in the display unit.

14. The information processing system according to claim 13, wherein
the display processing part displays the operation image in association with information commenting on the plurality of plays included in the content displayed in the first area.

15. The information processing system according to claim 1, wherein
a sponsor is associated with the support goods, and
the information presenting part presents the support information in association with information indicating the sponsor.

16. The information processing system according to claim 1, wherein
it is stipulated that a value of support associated with the support goods is paid to the player, and
the information processing apparatus further comprises a support record management part that stores, in the storage, a monetary value corresponding to the value of the support in association with the supporter who made the support request, in response to the information presenting part presenting the support information to the player.

17. The information processing system according to claim 16, wherein
a sponsor is associated with the support goods, and
the support record management part stores, in the storage, a part or all of the value of the support corresponding to the support information in association with the sponsor associated with the presented support information, in response to the information presenting part presenting the support information to the player.

18. The information processing system according to claim 1, further comprising
a control part that causes a storage medium to store information indicating the support goods in association with a player who is a recipient of the support goods on the basis of at least one of the moving image of the competition or the text indicating the situation in the competition, if the support information does not include information indicating the player who is the recipient of the support goods.

19. An information processing apparatus comprising:
a display processing part that causes a display unit to display content including text indicating a predetermined play name corresponding to each play that one player, among a plurality of players, performed and a name of the one player who performed the predetermined play in a competition, and an operation area for selecting support goods for supporting the one player, at each timing when the one player performed the predetermined play;
a request accepting part that accepts, from a supporter among a plurality of supporters of the competition, a support request for selecting support goods to cheer on the one player;
a memory that stores information for identifying the supporter that sent the support request, information for identifying the one player who receives the support, and the support information corresponding to the support goods, in association with each other; and
an information presenting part that presents, to the one player, the support information corresponding to the support goods and the supporter who selected the support goods in association with each other after the competition ends.

20. An information processing method executed by a computer, the method comprising the steps of:

displaying, on a display unit, content including text indicating a predetermined play name corresponding to each play that one player, among a plurality of players, performed and a name of the one player who performed the predetermined play, and an operation area for selecting support goods for supporting the one player, at each timing when the one player performed the predetermined play;

accepting, from a supporter among a plurality of supporters of the competition, a support request for selecting support goods to cheer on the one player;

storing information for identifying the supporter that sent the support request, information for identifying the one player who receives the support, and the support information corresponding to the support goods, in association with each other; and presenting, to the one player the support information corresponding to the support goods and the supporter who selected the support goods in association with each other after the competition ends.

* * * * *